United States Patent Office 3,576,762
Patented Apr. 27, 1971

3,576,762
CATALYSTS OF MODIFIED BASIC TRIVALENT METAL ACETATES
Françoise Maguet-Martin, Garches, Maseh Osgan, Rueil-Malmaison, and Philippe Teyssie, Le Vesinet, France, assignors to Institut Francais du Petrole, des Carburants et Lubrifiants, Rueil-Malmaison, France
No Drawing. Original application Feb. 14, 1966, Ser. No. 527,078, now Patent No. 3,427,260, dated Feb. 11, 1969. Divided and this application July 2, 1968, Ser. No. 766,343
Claims priority, application France, Feb. 19, 1965, 6,403
Int. Cl. C08g 23/14
U.S. Cl. 252—431                     16 Claims

ABSTRACT OF THE DISCLOSURE

There are provided polymerization catalysts especially useful for the polymerization of cyclic ethers. These catalysts have the formula $M_{6+2n}O_{7+3n}(OH)_2A_2$ wherein A is a carboxylic acid monovalent radical, M is a trivalent metal and $n$ is a number comprised between 0 and 10. These catalysts are produced by hydrolyzing a basic trivalent metal carboxylate, e.g. basic iron (III) acetate, and then dehydrating the resultant hydrolyzed carboxylate. Aluminum alcoholate or phenate may be added thereto.

---

This application is a division of application Ser. No. 527,078, filed Feb. 14, 1966, and now Pat. 3,427,260 issued Feb. 11, 1969.

This invention relates to new polymerization catalysts and to a process for polymerizing alkylene oxides by means of these catalysts.

More particularly the invention relates to the manufacture of polymerization catalysts from trivalent metal carboxylates and preferably also from an aluminium alcoholate.

It is known that some trivalent metal carboxylates such as technical basic iron acetate may be used as catalysts in the polymerization of propylene oxide as described in Example 5 of U.S. Pat. No. 2,706,182. However with such catalysts, the reaction rate is extremely low, being 264 hours in said example.

One object of this invention is to provide a process for polymerizing alkylene oxides at a high rate.

Another object is to provide such a process wherein a high yield of polymer is obtained.

One further object is to provide such a process wherein a polymer of high intrinsic viscosity is obtained.

One further object is to provide a new catalyst for this process.

These and other objects as will be apparent from the following description and claims are obtained when there is used as catalyst a hydrolyzed and then dehydrated basic trivalent metal carboxylate. Trivalent transition metal carboxylates which are advantageously employed in the preparation of catalytic compositions are trinuclear metal carboxylates as described in Gmelin's Handbuch der anorganischen Chemie, 8th edition, 52nd volume, p. 389, 58th volume, p. 704 and 59th volume, pp. 521 and 526 in G. Brauer, Handbuch der prëparativen anorganischen Chemie p. 1202.

The carboxylate $R(COO^-)_n$ radical may be a radical derived from compounds containing carboxylic acid grouping(s) of the formula $R(COOH)_n$ wherein R is any organic radical, more particularly a radical of an aliphatic, cycloaliphatic, or aromatic hydrocarbon; and $n$ is the valency of the radical R, for example, 1 or 2 etc. Examples of carboxylate containing compounds for examples include acetic, propionic, butyric, isobutyric, benzoic, toluic, succinic or ortho phthalic acid etc.

The metal associated with the carboxylic radical preferably will be chosen among the trivalent metals having an atomic number of 21 to 27 in the periodic chart of the elements.

As examples of these carboxylates, there are mentioned the monoacetate of the basic iron acetate complex of the formula $[Fe_3(OAc)_6(OH)_2](OAc) \cdot 2H_2O$. Any other basic iron acetate may be also successfully used.

Such carboxylates will, for example correspond to the following formulas:

$$[M_3A_6(OH_2)]A_3, xH_2O$$
$$[M_3A_6(OH_2)]X$$
$$[M_3A_5(OH_3)]X$$
$$[M_3A_3(OH)_{6-y}]Xy$$

wherein M is a metal preferably chosen from the group consisting of Sc, Ti, V, Cr, Mn and Fa, being intended that several metals may be present at the same time.

A is a monovalent radical from a carboxylic acid i.e. the ratio of the number of molecules of acid to the number of acid functions in the molecule (for example 1 mole of a monocarboxylic acid, half a mole of a dicarboxylic acid . . . and so on).

X is an anion
$x$ is a number chosen from 0 to 10
$y$ is an integer comprised between 0 and 5.

By way of example, the following carboxylates may be used:

$[Fe_3(OAc)_6](OAc_3(Ac{=}CH_3{-}CO{-})$
$[Fe_3(OAc)_6OH](OAc)_2$
$[Fe_3(OAc)_6(OH)_2](OAc)H_2O$
$[Fe_3(OAc)_4O(OH)_3]7H_2O$
$[Fe_3(OAc)_6(OH)_2]Cl7H_2O$
$[Fe_2Cr(OAc)_6(OH)_2](OAc)H_2O$
$[FeCr_2(OAc)_6(OH)_2]Cl6H_2O$
$[Cr_3(OAc)_6(H_2O)_2](OAc)_3H_2O$
$[Cr_3(OAc)_6(OH)_2](NO_3)xH_2O$
$[Cr_3(OAc)_5(OH)_3H_2O](OAc)11H_2O$
$[Cr_3(OAc)_5(OH)_3H_2O](OAc)5H_2O$
$[Cr_3(OAc)_3(OH)_3][Cr_3(OAc)_3(OH)_2](OAc)_710H_2O$
$[Cr_3(Propionate)_6(OH)_2](NO_3)3H_2O$
$[Mn_3(OAc)_6(H_2O)_2](OAc)_34H_2O$ The hydrolysis may be performed, for example, by heating the carboxylate in an inert organic liquid containing water.

An amount of water comprised between 0.01 and 100 times, preferably between 0.1 and 10 times by weight the amount of carboxylate is usually satisfactory.

Among the different liquids which may be used are acetone, ethanol, dioxane, tetrahydrofuran, chloroform, dichlorethane, toluene, xylene etc.

The proportion of this liquid may be chosen at will. However, it is preferred to use from 1 to 1000 times the weight of carboxylate.

The hydrolysis is usually performed at a temperature comprised between about 5 and about 200° C. and preferably in the range from about 50° to 135° C. It is advantageous to carry out this operation at the boiling point of the solvent.

This hydrolysis takes from few minutes to several hours. Sometimes it will be advantageously to carry out this hydrolysis in several steps in order to avoid excessive concentrations of free carboxylic acid, or even better, by means of a continuous process, the advantage of this latter process being obvious. The progress of hydrolysis may be followed by the change in colour. For example, for the iron (III) acetate, the color turns from a bright brick red to a very deep brown. During this hydrolysis, a reduction in the content of carboxylic groups occurs due probably to a partial substitution of "carboxylate" groups by "hydroxyl" groups. At the end of the hydrolysis, the brown crystals are separated from the liquid and may be purified by washing and drying. A hydrolysis process of this type is described, for example, by Wainland in Berichte der deutschen chemischen Gesellschaft, 45, 2669 (1912).

In order to avoid the formation of large quantities of free acid during this operation, one may use an acid acceptor. Among them are included bases and epoxy compounds, in particular epoxyethane and epoxypropane.

The resulting product must have as low a carboxylate content (for example acetate content) as is practically possible to obtain; moreover it contains either physically or chemically bound water and perhaps hydroxyl groups. Its catalytic activity is very low. Its chemical formula is not very well defined nevertheless we know that the ratio of the number of the monocarboxylic groups A to the number of metal atoms M is given by the relation:

$$\tfrac{1}{3} > A/M > \tfrac{1}{13}$$

An essential operation for the manufacture of the heterogeneous catalysts according to this invention consists of activating the aforesaid hydrolysis product by heating it preferably under vacuum and in the presence of an adsorption and/or absorption agent which takes up the water released during the activation. The heating temperature for this dehydrating step may be from 80° C. to 200° C. for 5 to 48 hours but it is better to activate the catalyst at a temperature on the order of 100° C. to 110° C. during 5 to 15 hours. At the end of the operation the product usually retains its crystalline appearance; it corresponds then probably to the general formula:

$$M_{6+2n}O_{7+3n}(OH)_2 A_2$$

where $n$ may have any one of the values from 0 to 10.

Starting, for example, from a basic iron acetate, a product is obtained which consists essentially of a brown iron oxide (in the ferric form $Fe^{+++}$) containing 3–5% (by weight) of OH and 10–15% of acetate. Such an activated catalyst must be kept either in vacuo, either under an inert gas such as nitrogen, dry argon . . . or in an organic liquid free of oxygen function and water, such as heptane, hexane, petroleum ether, toluene, xylene, tetrahydronaphthalene, decahydronaphthalene and the like.

When the above catalyst is admixed with an aluminium alcoholate or phenate, a catalytic composition of greatly increased activity is obtained.

The results depend on the atomic ratio Al/Fe, which may vary for example from 0.1 to 20 and preferably from 0.3 to 4, these limits being not limitative.

It is yet possible to increase the activity of the aforesaid catalyst formed from the hydrolysed carboxylate which has been activated by an aluminum alcoholate so as to obtain a greater polymerization rate, by heating the catalyst to a temperature comprised between 50 and 200° C. and preferably between 100 and 150° C. This thermal treatment, which may be short (about one hour for example) or extended to 10 hours or more is preferably performed on the catalyst suspended in an inert organic liquid, among others, a saturated or aromatic hydrocarbon.

It is yet possible to increases the catalyst activity after the above mentioned thermal treatment by successive hot washings of the catalyst already treated. With this object, at the end of the thermal treatment, the solid catalyst is separated, for example by filtration or decantation, from the organic liquid in which is was dispersed; then there is added a volume of the pure organic liquid (preferably a hydrocarbon) substantially equal to the volume of the solution which has been taken off previously. The mixture is then stirred for a while with heating, for example, from 1 minute to 1 hour; the liquid portion is then separated and the process is repeated as desired. . . . It has been found that the resulting solid catalyst polymerizes the epoxy or alkylene oxide monomers at a high rate and that the average molecular weights obtained are very high.

The washing operation of the catalyst hereinbefore described may be partially or completely replaced by a heating operation in vacuo. This operation may be carried out either by heating the solid catalyst in vacuo or by heating the catalyst which is in suspension in an inert organic liquid under partial vacuum; this is done in order to take off the volatile by-products when the said liquid is partially distilled, for example, to ⅓ or ⅔ of the initial volume. Among the liquids which may be used are: xylene, tetrahydronaphthalene, decahydronaphthalene, a petroleum fraction boiling between 200 and 250° C., etc.

To polymerize cyclic ethers, the catalyst of this invention is used under known polymerization conditions i.e. at a temperature comprised between, for example, 20 and 250° C., and preferably 50° and 200° C.

The amount of catalyst may be extremely low or it may reach high values. It is thought that the optimum figures are comprised between 0.05 and 20 gram-atoms of metal (preferably between 1 and 10 gram-atoms) per 100 gram-molecules of monomers.

Optionally we may use a diluent chosen preferably among paraffinic and aromatic hydrocarbons.

The crude polymerized product which appears as a solid (brown solid when it contains iron) may be purified by means of known methods. It is possible, for instance, to dissolve the crude polymer in an organic non water-miscible liquid and wash this solution of polymer with a mineral aqueous acid solution such as HCl or $HNO_3$, or with a chelating agent soluble in water.

Alternately, it is possible to dissolve the crude polymer in a water-miscible liquid; for example acetone may be used for polyepoxypropane.

A small amount of water is then added to transform the catalyst to hydrated oxide; the catalyst is filtered from the solution; the solvent is evaporated or the solution is poured in a great amount of water to isolate the polymer. The polymer is then colorless.

The cyclic ethers which may be polymerized according to the invention, comprise those the cycle of which includes 3 or 4 atoms, i.e. essentially the 1-2 epoxides and 1-3 epoxides (oxethanes or oxacyclobutanes).

These compounds contain advantageously 2 to 20 carbon atoms (preferably 2 to 12) per molecule.

Among the epoxides, we shall mention more particularly those having the general formula:

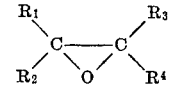

wherein the radicals $R_1$ to $R_4$ represent hydrogen atoms and/or hydrocarbon radicals eventually substituted by atoms or radicals which do not impede the polymerization. Mention will be made more particularly of alkyl, cycloalkyl, aryl, alkenyl and halogenated alkyl radicals.

As 1,2 epoxides the following may, for example, be used: epoxyethane, epoxypropane, 1,2-epoxybutane, 2,4-epoxybutane, epoxyisobutane, epichlorhydrin, styrene oxide, m-chlorostyrene oxide, α-methylstyrene oxide, cyclohexane oxide, phenylglycidylether, chlorophenylglycidylether, methylglycidylether, isopropylglycidylether, allylglycidylether, butadiene monoxide, vinylcyclohexane monoxide, dicyclopentadiene monoxide, cyclooctadiene monoxide, isooctene oxide.

Among the 1,3 epoxides there can be used by way of example, 3,3 - bis(chloromethyl) - oxacyclobutane, 1,3-epoxypropane, 2-methyloxetane, 3,3-bis(cyanomethyl)-oxetane, 3-ethyl-3-butyl oxetane, 3,3-diethyloxetane, 3-methyl-3 and propyl oxetane.

The monomers may be polymerized alone or in admixture. In this way, it will be possible to copolymerize 2, 3, 4 monomers, or more and obtain copolymers presenting useful characteristics.

In order that the invention may be clearly understood, some embodiments in accordance therewith will now be described by way of example.

EXAMPLE 1

Ferric crystalline acetate was prepared by portionwise addition of crystalline ferric nitrate into boiling acetic anhydride.

To a slurry of 5 g. of ferric acetate, prepared in the above indicated manner, in 250 ml. of boiling acetone, a water-acetone mixture containing 5 ml. water and 95 ml. of acetone was slowly added under reflux conditions; heating was continued after the addition was completed for 10 minutes and the resulting mixture was filtered. Originally the bright brick red color of ferric acetate crystals were turned to deep brown after this hydrolysis operation. This described hydrolysis operation was repeated on the same material for two more times, each time the insoluble crystalline material being filtered and washed with a little acetone. Finally it was thoroughly washed with acetone and dried at 100° C. under vacuo over phosphoric anhydride. The average analysis values, on several samples prepared as indicated, of percent iron and acetoxy content were found to agree at best with the following formula:

$$Fe_5O_7(OH)FeO(OOCCH_3)$$

After drying in vacuo, the product was slurried in dry n-heptane and stored in bottles previously flushed with dry argon, and capped with self-sealing rubber gaskets.

A Pyrex tube, flushed with dry argon, was charged with 20 ml. of propylene oxide and 5 ml. of a slurry of the above described ferric catalyst in heptane, equivalent to 5 milliatoms of iron. After sealing, the contents of the tube was agitated at 70° C. for 24 hours. The tube was then cooled in Dry Ice acetone, broken and the hard rubbery brown polymer was chopped, in small pieces and treated with dilute hydrochloric acid and toluene until the polymer dissolved in toluene, and the catalyst dissolved in the aqueous acidic phase.

The toluene solution of the polymer was then washed with dilute hydrochloric acid, and then with water, dilute sodium bicarbonate acid finally with water until neutral. After evaporation of the toluene, 5.3 g. of a tough rubbery polymer was obtained.

In another run, under exactly similar conditions, a sample of ferric acetate which was not subjected to a hydrolysis operation, was used as catalyst. Only 0.37 g. of polymer was obtained with no mechanical strength.

EXAMPLES 2 TO 6

The polymerization run described in the Example 1 was repeated by using different catalysts. In each of the following runs, an amount of catalyst corresponding to 5 milliatoms of metal was used.

In Table I the approximate catalyst formulae corresponding to the hydrolyzed metal acetate catalyst used for polymerization and the weight of polypropylene oxide obtained are shown.

TABLE I

| Formula: | Wt. of propylene oxide g. |
| --- | --- |
| $Cr_{10}O_{13}(OH)_2(-OOC-CH_3)_2$ | 2.1 |
| $Cr_{1.5}Fe_{8.5}O_{13}(OH)_2(-OOC-CH_3)_2$ | 2.65 |
| $Mn_2Fe_4O_8(OH)(-OOC-CH_3)$ | 6.75 |
| $Mn_{10}O_{13}(OH)_2(-OOC-CH_3)_2$ | 3.1 |
| $Cr_2Ti_4O_8(OH)(-OOC-CH_3)$ | 5.9 |

EXAMPLE 7

14 ml. of proplene oxide was polymerized under the polymerization conditions of Example 1 except besides an equivalent of 5 milliatoms of iron catalyst, 4 millimoles of aluminium isopropoxide was added. The yield of polymer was 8.2 g. of a solid product which had an intrinsic viscosity of 0.9 dl./g. determined in benzene at 30° C.

EXAMPLE 8

The polymerization in Example 7 was repeated with the following modification i.e. quantity of hydrolyzed ferric acetate catalyst containing the equivalent of 5 milliatoms of iron and 4 millimoles of aluminum isopropoxide were charged in a dry Pyrex tube previously flushed with dry argon, and the mixture was heated for 7 hours at 110°–120° C. in an oil-bath. After cooling, 14 ml. of propylene oxide was added, the tube sealed and agitated at 70° C. for 4 hours. After the workup, 7 g. of a powdery solid polymer was obtained whose intrinsic viscosity was 0.31 dl./g.

1 g. of the crude polymer thus obtained was dissolved in hot heptane and the solution was cooled to −35° C. Most of the polymer crystallized out from the solution. After filtration and drying, 0.87 g. of a colorless, highly crystalline polymer was obtained.

EXAMPLE 9

Example 8 was repeated with following modifications.

After heating the mixture of ferric catalyst and aluminum isopropoxide at 110–120° C. for 7 hours, the insolubles were left to settle; then the liquid fraction was siphoned off under a dry argon blanket. Then 10 ml. of fresh n-heptane was added to this insoluble fraction, the slurry was heated under agitation at 110–120° C. for 10 minutes, then left to settle at this same temperature, the liquid portion siphoned off and this same operation was repeated for three more times. Finally the insoluble material was left to cool to room temperature and sufficient dry heptane was added to obtain a slurry containing 1 milliatom of iron per ml. of slurry.

A polymerization was run with 29 ml. of propylene oxide and 0.5 ml. of the above slurry at 70° C. for 15 hours. 10.3 g. of a very tough, rubbery polymer with an intrinsic viscosity of 4.8 dl./g. was obtained.

EXAMPLE 10

Example 8 was repeated with the following modification.

After heating at 110–120° C. for 7 hours, 20 ml. of dry xylene was added to the catalyst mixture; then two thirds of the liquid was distilled off. Sufficient heptane was added to the residue to obtaine a slurry of catalyst containing the equivalent of 1 milliatom iron per ml. of slurry.

25 ml. propylene oxide was polymerized with 0.5 cm.³ of this slurry at 70° C. for 15 hours. The yield of the polymer was 9.8 g. and its intrinsic viscosity was 4.9 dl./g.

EXAMPLE 11

Example 9 was repeated with the following modification.

A mixture of 9.2 ml. of propylene oxide and 3.5 ml. of allylglycidyl ether was copolymerized with 1 ml. of the catalyst slurry of Example 9, at 70° C. for 5 hours. The polymer obtained weighed 4 g.; it was a very snappy rubber. The double bond content was determined by the procedure given by Kolthoff (cf. Journal of Polymer Science, vol. 3, page 66 (1948)). It was found to contain 4 to 4.5 mols percent of double bonds based on the sum of unit moles of propylene oxide and allylglycidyl ether.

EXAMPLE 12

In a Pyrex tube, closed at one end and flushed with dry argon, 12 ml. of 2,2-bis chloromethyl-1,3-epoxy propane was charged. To this an equivalent of 1 milliatom iron catalyst slurry of Example 9 was added, and the filled portion of the tube was immersed in a silicone oil bath heated to 175° C. After a few minutes, a portion of this monomer began to boil and the upper portion of tube served as an air condenser. After about 12 minutes the refluxing of the monomer had ceased. The tube was removed from the bath; it was broken and the polymer was chopped to small pieces, digested first with methanol containing 5% HCl, then washed several times with methanol. After drying, 15 g. of a white, very tough polymer was obtained.

What we claim is:
1. A process for manufacturing a polymerization catalyst, said process comprising:
   (a) a first step of contacting a basic hydrocarbon carboxylate of a trivalent metal having an atomic number of 21–27 inclusive with water, said contacting being conducted at 5–200° C. with a quantity of water of 0.01–100 times the weight of said basic hydrocarbon carboxylate; and
   (b) a second step of heating the resultant product at 80–200° C.
2. The process of claim 1, wherein the quantity of water is 0.1 to 10 times the weight of the basic hydrocarbon carboxylate.
3. The process of claim 1, wherein the basic hydrocarbon carboxylate is a basic iron (III) acetate.
4. The process of claim 1, wherein said water is used in admixture with an inert organic liquid.
5. The process of claim 1, wherein said water is used in admixture with a member of the group consisting of acetone, ethanol, dioxane, tetrahydrofuran, chloroform, dichlorethane, toluene and xylene.
6. The process of claim 4, wherein the amount of inert organic liquid is 1–1,000 times the weight of the basic carboxylate.
7. The process of claim 1, wherein said first step is conducted at 50–135° C.
8. The process of claim 1, wherein said second step is conducted at 100–150° C. for 5–15 hours.
9. The process of claim 3, further comprising a third step (c) of reacting the product of step (b) with an aluminum alcoholate, used in an amount corresponding to an atomic ratio of Al to Fe of 0.1–20.
10. The process of claim 9, further comprising a fourth step (d) of heating the product of step (c) at 100–150° C.
11. The process of claim 10 further comprising a fifth step (e) of contacting the product of step (d) with a liquid hydrocarbon.
12. As a new composition, the product prepared from the process of claim 1.
13. As a new composition, the product prepared from the process of claim 3.
14. As a new composition, the product prepared from the process of claim 9.
15. As a new composition, the product prepared from the process of claim 10.
16. As a new composition, the product prepared from the process of claim 11.

References Cited
UNITED STATES PATENTS

| | | | |
|---|---|---|---|
| 3,457,186 | 7/1969 | Marsico | 252—431(CARB)X |
| 3,459,677 | 8/1969 | Robeson | 252—431(CARB)X |

PATRICK P. GARVIN, Primary Examiner

U.S. Cl. X.R.

260—429, 429.5, 438.5, 439

UNITED STATES PATENT OFFICE
CERTIFICATE OF CORRECTION

Patent No. 3,576,762          Dated April 27, 1971

Inventor(s) Francoise Maguet-Martin et al.

It is certified that error appears in the above-identified patent and that said Letters Patent are hereby corrected as shown below:

Column 2, Line 19, change "Fa," to ---Fe---

Column 3, Line 33, change "110° C." to ---150° C.---

Column 6, Line 37, change "29 ml." to ---25 ml.---

Signed and sealed this 10th day of August 1971.

(SEAL)
Attest:

EDWARD M. FLETCHER, JR.
Attesting Officer

WILLIAM E. SCHUYLER, J
Commissioner of Patent